June 19, 1962  G. E. BEVIS ETAL  3,039,420
STEERING MECHANISMS
Filed Oct. 5, 1959
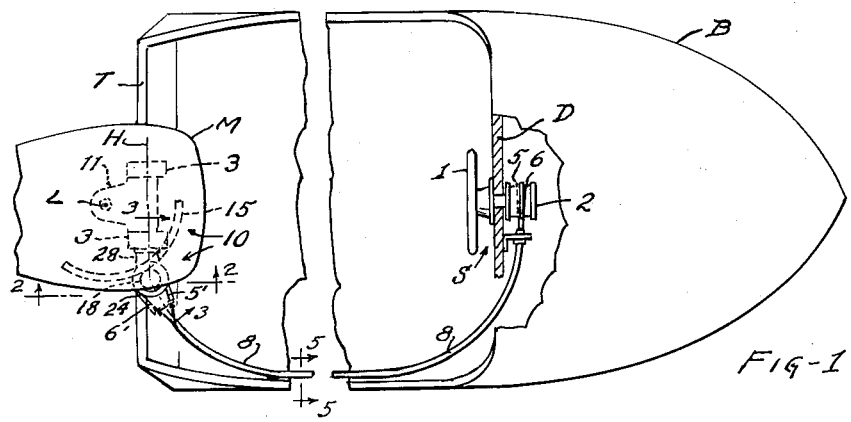
FIG-1
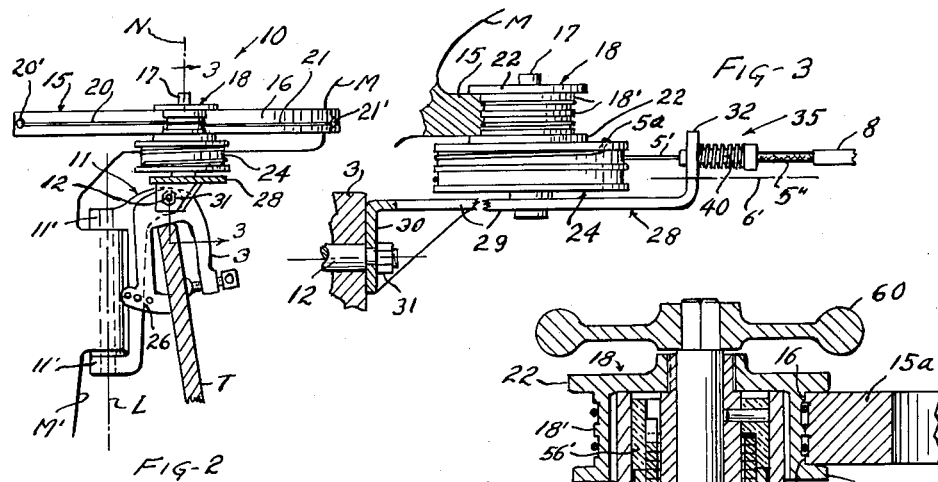
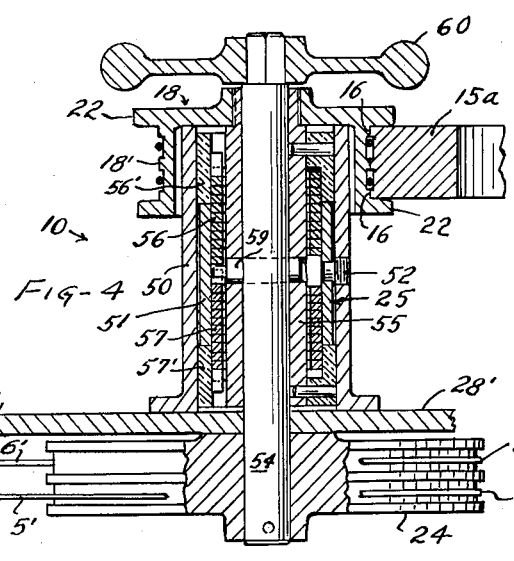
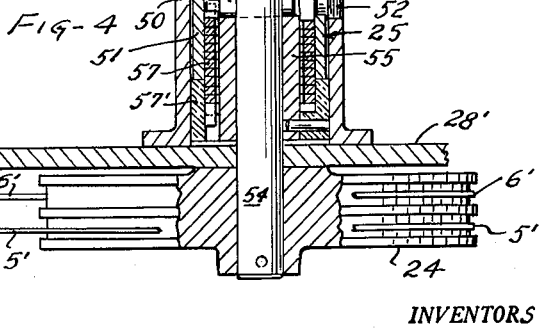
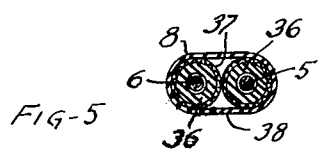
FIG-5
INVENTORS
G. E. BEVIS
P. C. HUNGERFORD JR.
R. F. NEFF
By George M Soule
ATTORNEY United States Patent Office 3,039,420
Patented June 19, 1962

3,039,420
STEERING MECHANISMS
George E. Bevis, Chagrin Falls, Philip C. Hungerford, Jr., Cleveland Heights, and Russell F. Neff, East Cleveland, Ohio, assignors to Curtiss-Wright Corporation, a corporation of Delaware
Filed Oct. 5, 1959, Ser. No. 844,331
6 Claims. (Cl. 115—18)

The present invention relates to an improved cable operated steering control mechanism (e.g. for dirigible equipment such as represented by outboard motor and propeller units for boats), and to an improved and simplified manner of enabling a steering member such as an outboard motor unit, mounted as usual on the transom of the boat hull, to be swung about a normally upright axis for steering by manually applied forces on a steering wheel or the like located forwardly or remotely of the motor unit in a convenient position for steering.

It is common in the art to rig drum-connected cables of a steering wheel unit located forwardly in the hull so as to turn outboard motor units to and fro for steering. If push-pull cable systems are used in suitable guides their use is accompanied by considerable power loss under high load, making the steering operations require undesirable physical exertion or too much manipulation of the wheel for small amounts of angular movement of the motor unit for steering. Also push-pull elements must be designed with high column strength to prevent buckling, and sharp curves or bends cannot be made in order to facilitate installation. If the cables are rigged in pairs so as to be alternately placed in tension to swing the motor unit for steering, then the rigging equipment becomes complex and invariably places a highly undesirable amount of strain on the hull or parts thereof particularly at the guide sheave brackets where usually the directions of extent of the cables change sharply. Additionally, with conventional arrangements for pull-pull steering by cables, the torque required to turn the motor unit varies with the extent of turning, i.e. increasing with turning of the motor unit about its steering axis from straight-ahead steering position into positions for making turns.

The present control system enables the pilot or driver to effect the necessary turning motions for steering solely through imposition of tension forces on the cables, minimizes strain on the cables, has uniform torque for all turned positions of the steering member or motor unit, requires a minimum amount of space and cable attachment devices (only at the steering wheel assembly and outboard motor assembly if desired) and greatly facilitates and simplifies installation.

Additionally, the present invention includes a novel arrangement of a bidirectional no-back unit (hereinafter usually BDNB), in steering rigging such as outlined above, whereby the steering wheel or tiller cannot be subjected to back drive from the rudder or motor unit (external forces) to the steering wheel or tiller, thereby facilitating holding of the boat on course in any desired direction without requiring constant attention of the steersman. The present preferred bidirectional no-back installation or placement enables the operator to leave his or her usual steering position in the boat and to go astern (e.g. for attention to the motor unit), and at such times steer the boat by manual application of torque to an input element of the BDNB unit. Unique advantages of such placement of the BDNB unit are that certain inherent input-toward-output backlash necessary for BDNB operation can be made practically imperceptible to the pilot at normal steering position, and at the motor unit the pilot can effect steering as by a short crank or a small hand-wheel through whatever mechanical advantage is built into the torque transmission mechanism.

Objects and features not indicated by the above will be brought out in connection with the following description of the preferred forms shown in the drawing. The essential characteristics are summarized in the claims.

In the drawing FIG. 1 is a diagrammatic plan view of a boat hull and outboard motor unit thereon with the present pull-pull cable system installed. FIG. 2 is an enlarged fragmentary side elevation, viewed as at 2—2, FIG. 1, of portions of a conventional outboard motor unit and portions of the present subject mechanism. FIG. 3 is a further enlarged partial sectional view of a portion of the steering mechanism taken generally along the line 3—3 in FIG. 2. FIG. 4 is a still further enlarged central sectional view through a modified assembly incorporating the preferred BDNB mechanism, FIG. 4 showing an improved resilient cable sheath connection with the steering mechanism according to FIGS. 1 through 3. FIG. 5 is a transverse sectional view of a preferred twin cable and sheath assembly, taken as at 5—5 in FIG. 1.

FIG. 1 hereof partially shows a typical boat B having a dash panel D and transom T. The steering wheel assembly S comprising a wheel 1 and cable drum 2 is suitably mounted on the dash panel D so that the drum 2 is behind the dash panel. A BDNB unit 25 (similar to that shown in FIG. 4 hereof) may be incorporated in the wheel and drum assembly S substantially as shown in a prior application of J. J. Magill et al. Serial No. 731,271 filed April 28, 1958 now Patent No. 2,947,278 and provided with a release device, as in FIG. 1 thereof, to enable steering at desired times by direct manipulation of the motor unit.

An outboard motor unit represented only by its main housing M is mounted on the transom T by a conventional clamp bracket 3 more clearly shown in FIG. 2, which enables the motor unit to be swung inboard as desired. Cables 5 and 6 attached to the drum 2 and wound thereon in relatively opposite directions extend rearwardly in a common sheath assembly 8 as alongside one wall of the hull to a reduction drive or torque amplifier mechanism 10 on the motor unit for imparting torque thereto in opposite directions about a generally upright steering axis L FIGS. 1 and 2. In the illustrated type of outboard motor unit axis L is forwardly from the usual propeller drive shaft axis not shown.

Referring especially to FIG. 2 the motor supporting bracket 3 is clamped tightly to the boat transom T and a suitable swingable support for the motor housing M comprises a bracket 11 pivoted to the clamp bracket 3 on a horizontal axis H intersecting the clamp bracket 3 and established in part by a pivot pin 12, FIGS. 2 and 3. The swingable connection between the pivot bracket 11 and the propeller shaft portion M' of the housing M may include rearwardly extending ear portions 11' of bracket 11 intersected by steering axis L, so that steering can be effected (e.g.) manually by the use of a tiller (not shown) attached to motor housing M.

Torque amplifier mechanism 10 comprises as shown an arcuate rigid flange member 15 on the motor housing M, shown as a segment of a complete circle integral with the housing M although it may be made as a suitably curved bar (see 15a FIG. 4) attached to the housing M concentric with steering pivot axis L. Adjacent to the arcuate member 15 and in rolling hence frictional driving contact with its outer face 16 is a freely turnable drum 18 supported as on a stub shaft 17 on an axis N parallel to axis L. The rolling contact between the peripheral face 18' of the drum 18 and the face 16 of arcuate member 15 is maintained by two flexible approximately inextensible elements 20 and 21, for example multiple strand stainless steel cables, wound tightly about the drum 18 and fastened thereto if desired and extending in opposite directions away from the drum along the arcuate face 16. The "free" ends of the cables 20 and 21 are rigidly attached to the member 15 as by screws 20' and 21'. The cables 20 and 21 can be a single piece of cable wound one or more times around the drum 18 as suggested by FIG. 1, but preferably at least two separate cables are employed. Thereby the cables tend strongly to hold the axis of the drum 18 parallel to the steering axis, as L FIG. 2. In order, inter alia, to hold "land" faces of the segment 15 and drum 18 in rolling contact the cable stretches are recessed into the faces 18' and 16 in suitable peripheral grooves intersecting the respective faces as most clearly shown in FIG. 4 (two pairs of grooves being shown, defining three pairs of land faces, as will be evident). The grooves, in the region of rolling contact hold the cables against dislocating movement axially of the drum 18. Torque forces can be neutralized or balanced by using for example three cables or sets of cables (not shown) between the drum 18 and bar or segment 15. The cable stretches are drawn tight before attachment as at 20', 21' and/or to drum 18; and the drum 18 has one or more guide flanges such as 22 operatingly in contact with vertically exposed faces of the segment 15 as will be apparent from comparison of FIGS. 2 and 3.

The drum 18 is driven in the desired directions and with provision for torque amplification (e.g. two to one ratio or as shown) by a grooved wheel or pulley 24 to which the end portions 5' and 6' of the cables 5 and 6 remotely of the steering wheel and drum assembly 1, 2 are attached, being wound on the wheel 24 in relatively opposite directions and suitably attached to the wheel as by screws or heads (cf. 5a FIG. 3). Wheel 24 may be operatingly integral with drum 18; but in that case the outboard motor housing M cannot normally be swung about the steering axis L without having to drive the steering wheel 1. The preferred arrangement is to couple the drum 18 to the wheel 24 by the BDNB assembly 25, the form of which as shown in FIG. 4 will be described later. Wheel 24 forms the input to the BDNB assembly 25 and the drum 18 the output.

Since the motor housing M is usually required to be adjustably positioned at selected angles about pivot axis H with reference to the clamp bracket 3 (as by a device indicated 26 FIG. 2) and sometimes to be partially disconnected from the bracket 3 and swung bodily inboard to a carrying position, the drum and wheel assembly 18, 24 needs also to be supported on the axis H. Provision for support as shown comprises a bracket 28 having an arm portion 29 for supporting the stub shaft 17 of the drum and wheel assembly and an upright or base portion 30 for connection to the pivot pin 12 or to the bracket 3 as by a nut 31, FIG. 3. The supporting base 30 is either rigidly secured to the pivot pin 12 or swiveled thereon depending upon the design of pivotal connection on axis H between the clamp bracket 3 and the swingable motor housing support bracket 11. The individual cable sheath extensions (from sheath 8) leading to the cable portions 5' and 6' are supported by slidable resilient mounting assemblies 35 described below.

The illustrated cable and sheath assembly 8 (see FIG. 5), is composed of flexible tubing 36 for respective cables 5 and 6 made of vinyl linear polyethylene and loosely around the cables 5 and 6. The tubes 36 have braided stainless steel armour casings 37 bonded to or operatingly integral with the polyethylene and the outer (e.g.) plastic sheath 38 is suitably fixed as by cement or a further plastic layer to the braided casings. Each armour casing 37 is preferably individually enveloped by a polyethylene cover (not shown). With such composite integral guide tube construction the frictional drag of the cable which is being payed out from the drum 2 and taken in on the wheel 18 tends to serve as neutralizing reactance for the larger frictional forces between the other cable and its guide tube as that other cable is wound onto the drum 2 to effect steering.

Experience has demonstrated that as the armour-sheathed tube extensions (5" and 6" in FIGS. 3 or 4) are subjected frictionally to axial forces by the cable the tension on the cable (e.g. 6' FIG. 4) being pulled in by the steering drum 2 can be minimized for a given load if the armoured sheath extensions 5" and 6" are yieldably guided by the bracket arms 32 or 32'. Thus, as shown particularly in FIG. 4, the composite armoured end portions of the sheath are snugly but slidably supported in the bores of approximately rigid sleeves 40 (e.g. hard nylon) having inner axial shoulders 41 to abut the sheath ends and the sleeves have free sliding support in holes 42 in the bracket arms. Coil springs 44 reacting on the head portions 45 of respective sleeves 40 and the bracket arms (32 or 32') enable one sheath end portion (e.g. 6" whose cable 6' is under high tension) to move toward its associated bracket arm while the other (e.g. 5") moves away therefrom. Thereby the stretching strains to which the cables 5 and 6 are alternately subjected are lessened, and consequently wear on the plastic tubes 36 can be greatly reduced as compared to the wear which occurs with cable sheath mountings of fixed type. The spring guide devices 35 can also be provided as mountings for the cable and sheath assemblies adjacent the steering drum 2.

In FIG. 4 the BDNB assembly 25 referred to earlier is substantially that of the Magill et al. application FIG. 2 thereof, and is supported in a fixed tubular casing 50 attached rigidly to bracket 28'. A tubular brake drum 51 is secured to and inside the casing 50 as by a screw 52 (or a release pin such as shown at 20 in said application). The shaft 54 secured to cable wheel 24 of the torque transmission mechanism 10' is the input member of the BDNB and tubular shaft 55, secured to cable drum 18, is the output member. Helical friction springs 56 and 57 preloaded radially against the drum 51 are attached at their relatively remote ends to bearing collars 56' and 57' pinned to output member 55. A lost motion connection (pin 59 on shaft 54 operating in short circumferential slots, not shown, in member 55) serves alternately to deenergize the helical springs 56 and 57 to permit the input shaft 54 to drive cable drum 18 in two directions while the springs block back drive to shaft 54 with zero backlash. Removable handwheel 60 (or a wrench) fits the exposed top end of the input shaft 54 to permit manual steering at a point or region directly adjacent the outboard motor unit or other steering member operated by the cable system. Thus the BDNB unit requires no release pin as would such unit if embodied in the steering wheel and drum mechanism S.

We claim:

1. In a steering mechanism, a steering member swingable about a generally vertical axis for steering, an arcuate member extending circumferentially of said axis coaxially thereof, a drum adjacent to the arcuate member and rotatable on an axis which is fixed in parallel relation to the axis of the steering member, flexible and substantially inextensible tension elements wrapped about the drum, each extending along and in driving contact with the arcuate member respectively in opposite directions and anchored to the arcuate member remotely of the drum, and torque transmitting means connected to the drum to turn it in opposite directions.

2. The mechanism according to claim 1, wherein the drum and arcuate member are peripherally grooved to define lands in rolling contact with each other, and the flexible tension elements lie in the grooves.

3. The mechanism according to claim 1, wherein the torque transmitting means includes a wheel having a rim portion larger than the mean diameter of the drum and constrained to turn with the drum in opposite directions, and a pair of cables extending in relatively opposite directions, end portions of the cables extending at least partially around the wheel and secured thereto.

4. In a steering mechanism for a boat, a steering member swingable about an upright axis for steering the boat, a cable drum remotely of the steering member and adapted to be turned manually for steering, a pair of cables extending from the drum and wound on the drum in relatively opposite directions, flexible guiding tubes for the cables, a torque transmitting means connecting end portions of the cables remotely of the drum to the steering member to turn it about said upright axis, and rigid bracket means supporting the flexible tubes, said means including sleeves carrying respective tubes, and springs between the respective sleeves and bracket means enabling the associated portions of the tubes to move axially with reference to the associated portions of the cables.

5. In a steering mechanism including a steering member movable for steering about an upright axis, a cable guide circumferentially of said axis, a rotary drum and means to support the drum in rolling contact with the guide, captive cable means secured to the drum and guide for moving the guide relative to the supporting means upon angular movement of the drum, a torque transmitting member coaxially of the drum for turning it, and a bidirectional no-back brake mechanism between the torque transmitting member and the drum.

6. The mechanism according to claim 5, wherein the torque transmitting member constitutes an input element of the bidirectional no-back mechanism and the drum an output element thereof, a portion of the torque transmitting member extending through the bidirectional no-back mechanism and drum and being accessible for manipulation by a person to turn the torque transmitting member and thereby turn the steering member.

References Cited in the file of this patent
UNITED STATES PATENTS

| | | |
|---|---|---|
| 497,706 | Chase et al. | May 16, 1893 |
| 1,767,584 | Hammer | June 24, 1930 |
| 2,627,833 | Schroeder | Feb. 10, 1953 |
| 2,786,361 | Russell | Mar. 26, 1957 |
| 2,826,084 | Turtle | Mar. 11, 1958 |
| 2,875,722 | Post | Mar. 3, 1959 |